US010349780B2

(12) United States Patent
Dukat

(10) Patent No.: US 10,349,780 B2
(45) Date of Patent: Jul. 16, 2019

(54) HERB GRINDING DEVICE

(71) Applicant: Dane Joseph Dukat, Mesa, AZ (US)

(72) Inventor: Dane Joseph Dukat, Mesa, AZ (US)

(73) Assignee: PHOENICIAN ENGINEERING, LLC, Mesa, AZ (US)

( * ) Notice: Subject to any disclaimer, the term of this patent is extended or adjusted under 35 U.S.C. 154(b) by 221 days.

(21) Appl. No.: 15/600,306

(22) Filed: May 19, 2017

(65) Prior Publication Data

US 2017/0251878 A1  Sep. 7, 2017

Related U.S. Application Data

(63) Continuation of application No. 14/681,808, filed on Apr. 8, 2015, now Pat. No. 9,681,777.

(51) Int. Cl.
| | |
|---|---|
| *A47J 42/00* | (2006.01) |
| *A47J 42/14* | (2006.01) |
| *B02C 23/10* | (2006.01) |
| *A47J 42/40* | (2006.01) |

(52) U.S. Cl.
CPC ............. *A47J 42/14* (2013.01); *A47J 42/40* (2013.01); *B02C 23/10* (2013.01)

(58) Field of Classification Search
CPC .................................. A47J 42/14; A47J 42/40
USPC ................................................ 241/169.1, 91
See application file for complete search history.

(56) References Cited

U.S. PATENT DOCUMENTS

| 4,280,666 A * | 7/1981 | Jones | A47J 42/34 241/100 |
|---|---|---|---|
| 5,322,227 A * | 6/1994 | Fiocchi | A61J 7/0007 241/100 |
| 7,367,519 B2 * | 5/2008 | de Groote | A47J 19/04 241/168 |
| 7,422,170 B2 * | 9/2008 | Bao | B02C 18/24 241/168 |
| 7,878,437 B2 * | 2/2011 | Rice | A47J 42/08 241/189.1 |
| 8,083,167 B1 * | 12/2011 | Namakian | A47J 42/24 241/169.1 |
| 2006/0192043 A1 * | 8/2006 | Fornage | A47J 42/08 241/169.1 |
| 2009/0134256 A1 * | 5/2009 | Rice | A47J 42/04 241/169.1 |
| 2009/0256016 A1 * | 10/2009 | Lauzet | A47J 42/18 241/169.1 |

(Continued)

*Primary Examiner* — Faye Francis
(74) *Attorney, Agent, or Firm* — Weiss & Moy, P.C.; Jeffrey D. Moy

(57) ABSTRACT

An herb grinding device is disclosed that includes a first section and a second section. The first section includes a first cavity, a top surface, an outer wall surrounding the first cavity, and a plurality of teeth extending from the top surface. The second section is rotatably coupled to the first section and includes a second section floor, a plurality of holes in the second section floor, a second cavity facing the first cavity, a plurality of teeth extending from the second section floor, and an annular flange positioned within the first cavity and interfacing an outer wall of the first section. The herb grinding device may also include a third section that is removably coupled to the second section opposite the first section and includes a channel extending through the third section, and a fourth section that is removably coupled to the third section and includes a collection cavity.

15 Claims, 18 Drawing Sheets

(56) References Cited

U.S. PATENT DOCUMENTS

| | | | |
|---|---|---|---|
| 2012/0286081 A1* | 11/2012 | Delbridge | A47J 42/14 241/169.1 |
| 2013/0015278 A1 | 1/2013 | Edwards | |
| 2013/0277473 A1* | 10/2013 | Delbridge | A47J 42/08 241/169.1 |
| 2014/0217213 A1 | 8/2014 | Edwards et al. | |

* cited by examiner

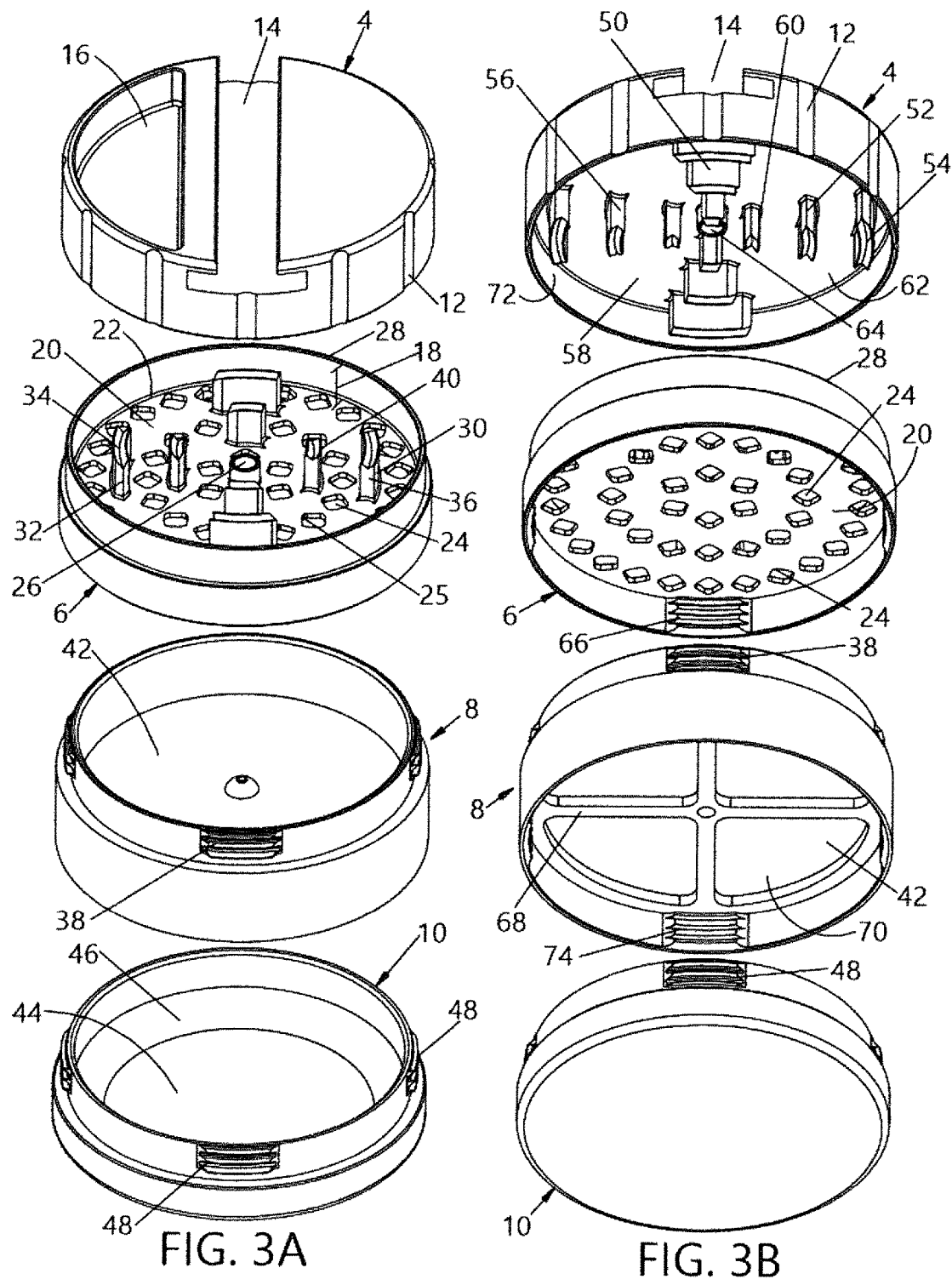

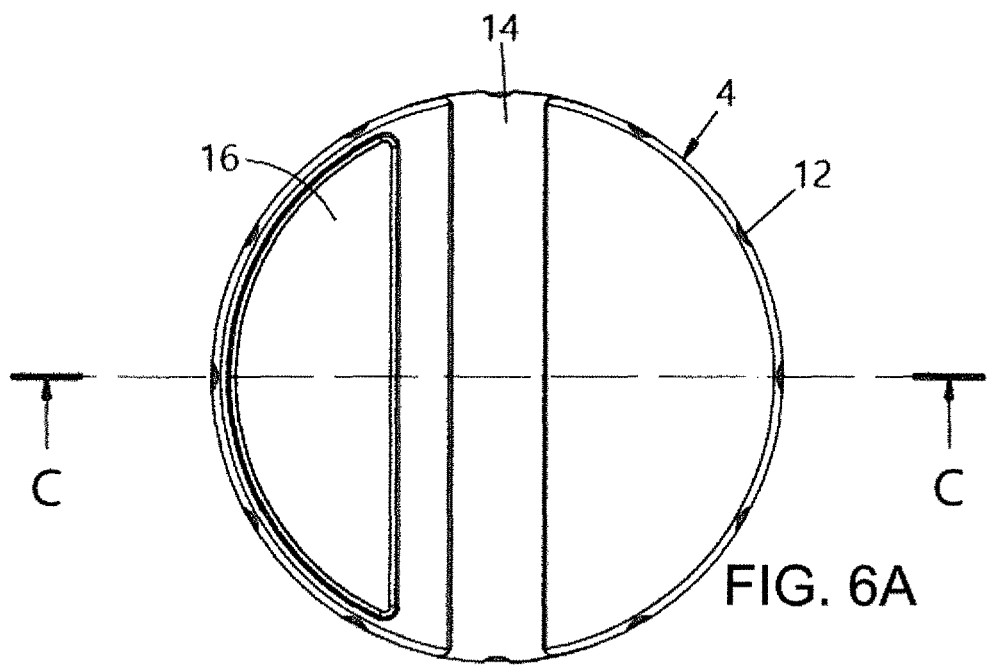
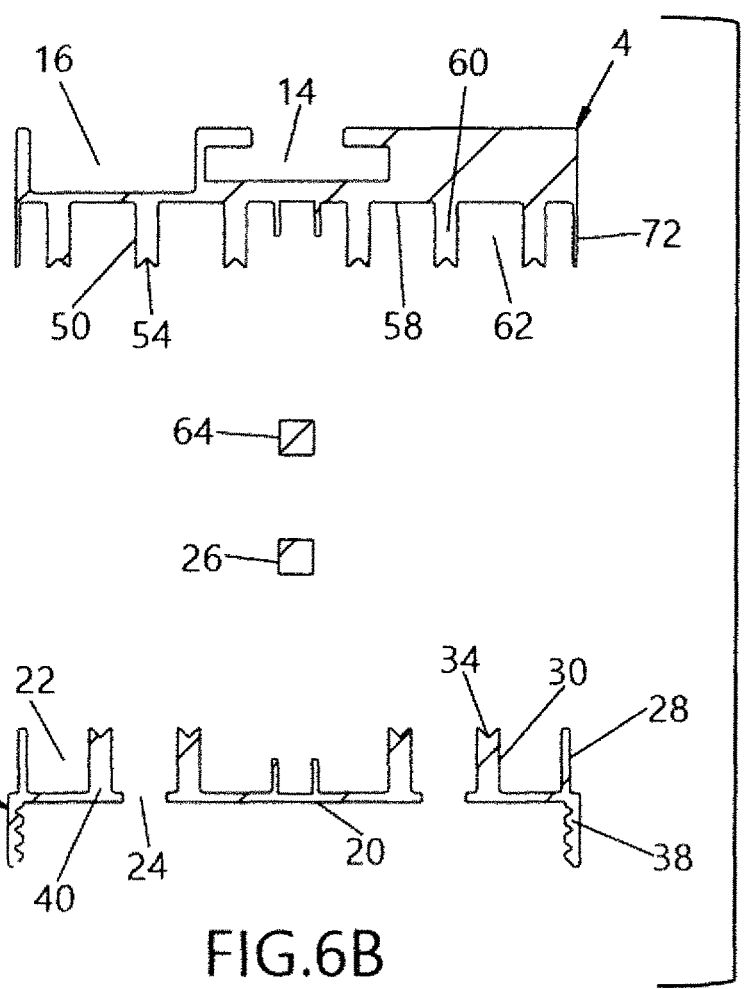
FIG. 6A
FIG. 6B

HERB GRINDING DEVICE

CROSS REFERENCE TO RELATED APPLICATIONS

This document is a Continuation of U.S. patent application Ser. No. 14/681,808 entitled "Herb Grinding Device" to Dukat, which was filed on Apr. 8, 2015 which claims the benefit of the filing date of U.S. Provisional Patent Application 61/978,919 entitled "Herb Grinding Device" to Dukat, which was filed on Apr. 13, 2014, the contents of which are hereby incorporated by reference.

BACKGROUND

1. Technical Field

Aspects of this document relate generally to herb grinding devices.

2. Background Art

Grinders are commonly used for rendering foods and spices to mulch or particulate form. Conventional food grinders are typically a large home or industrial scale device suitable for shearing/grinding large volumes of food or herbs. Such food grinders may typically be driven by a motor that cause an excessive amount of heat energy to be transferred to the herb, thus increasing the risk of heating and spoiling the herb. Furthermore, certain herbs are required in only small quantities at a time for specific consumption.

SUMMARY

According to one aspect, an herb grinding device comprises a first cylindrical section, a second cylindrical section, and at least a third cylindrical section. The first cylindrical section comprises a first cavity, a top surface, and a plurality of circular arced teeth extending from the top surface within the first cavity in at least two concentric teeth rings, each of the at least two concentric teeth rings comprising at least two circular arced teeth. The second cylindrical section is rotatably coupled to the first cylindrical section and comprises a second cavity facing the first cavity, a second section floor, a plurality of holes in the second section floor, and a plurality of circular arced teeth extending from the second section floor within the second cavity in at least two concentric teeth rings each comprising at least two circular arced teeth, wherein the at least two concentric teeth rings of the second cylindrical section are positioned between the at least two concentric teeth rings of the first cylindrical section and the plurality of circular arced teeth of the second cylindrical section at least partially overlap the plurality of circular arced teeth of the first cylindrical section. The at least a third cylindrical section is removably coupled to the second cylindrical section and comprises a collection cavity.

Various implementations and embodiments may comprise one or more of the following. The at least third cylindrical section may comprise a third cylindrical section removably coupled to the second cylindrical section opposite the first cylindrical section, the third cylindrical section comprising a channel extending through the third cylindrical section and one or more support arms extending across the channel, and a fourth cylindrical section removably coupled to the third cylindrical section opposite the second cylindrical section, the fourth cylindrical section comprising the collection cavity. The plurality of holes in the second section floor may be arranged in at least two concentric hole rings each comprising a plurality of holes, each of the at least two concentric hole rings being aligned with each of the at least two concentric teeth rings of the first cylindrical section. Each of the plurality of holes may be substantially square in shape with a corner directed to a center of the second section floor. Each circular arced tooth of the plurality of teeth of the first cylindrical section may comprise a V-shaped protrusion on a first end of the circular arced tooth, a crescent shaped recess on a second end of the circular arced tooth opposite the first end, and a V-shaped recess on a bottom end of the circular arced tooth opposite the top surface; each circular arced tooth of the plurality of teeth of the second cylindrical section may comprise a V-shaped protrusion on a first end of the circular arced tooth, a crescent shaped recess on a second end of the circular arced tooth opposite the first end, and a V-shaped recess on a top end of the circular arced tooth opposite the second section floor; and the plurality of teeth of the first cylindrical section and the plurality of teeth of the second cylindrical section may be positioned such that the V-shaped protrusions of the plurality of teeth of the first cylindrical section point opposite the V-shaped protrusions of the plurality of teeth of the second cylindrical section. The second cylindrical section may comprise an annular flange positioned within the first cavity and interfacing an outer wall of the first cylindrical section; the at least two concentric teeth rings of the first cylindrical section may comprise three concentric teeth rings each comprising four teeth; the at least two concentric teeth rings of the second cylindrical section may comprise two concentric teeth rings each comprising four teeth, a first concentric teeth ring of the two concentric teeth rings of the second cylindrical section being positioned between a first and a second concentric teeth ring of the three concentric teeth rings of the first cylindrical section, and a second concentric teeth ring of the two concentric teeth rings being positioned between the second and a third concentric teeth ring of the three concentric teeth rings of the first cylindrical section. Each of the plurality of teeth of both the first and the second cylindrical sections extend between approximately 25 and approximately 35 degrees and a width of each of the plurality of teeth of the first cylindrical section and the second cylindrical section is equal to a distance between adjacent concentric teeth rings of the first cylindrical section and second cylindrical section, and the herb grinding device may further comprise a gap of approximately 0.010" inches between the bottom end of each of the plurality of teeth of the first cylindrical section and the second section floor and a gap of approximately 0.010" inches between the top end of each of the plurality of teeth of the second cylindrical section and the top surface. The first cylindrical section may be coupled to the second cylindrical section with a first magnet positioned at a center of the top surface and a second magnet positioned at a center of the second section floor and in contact with the first magnet at a center point between the top surface and the second section floor. The herb grinding device may comprise a radiused edge within the collection cavity and a screen coupled to the one or more support arms and positioned within the channel. The first cylindrical section may comprise a recessed outer cavity, a T-shaped slot, and one or more gripping slots, and the second cylindrical section may be threadedly coupled to the third cylindrical section with four first threading notches and the third cylindrical section may be threadedly coupled to the fourth cylindrical second with four second threading notches.

According to another aspect, an herb grinding device comprises a first section, a second section, a third section, and a fourth section. The first section comprises a first cavity, a top surface, an outer wall surrounding the first cavity, and a plurality of teeth extending from the top surface within the first cavity. The second section is rotatably coupled to the first section and comprises a second section floor, a plurality of holes in the second section floor, a second cavity facing the first cavity to form a grinding chamber between the second section floor and the top wall, a plurality of teeth extending from the second section floor within the second cavity, and an annular flange positioned within the first cavity and interfacing an outer wall of the first section. The third section is removably coupled to the second section opposite the first section, and the third section comprises a channel extending through the third section and one or more support arms extending across the channel. The fourth section is removably coupled to the third section opposite the second section, and the fourth section comprises a collection cavity.

Various implementations and embodiments may comprise one or more of the following.

11. The herb grinding device of claim 10, wherein the first section comprises a recessed outer cavity adjacent a T-shaped slot, and wherein the second section is threadedly coupled to the third cylindrical section with four first threading notches and the third section is threadedly coupled to the fourth second with four second threading notches. Each of the plurality of teeth of the first section may be arced and positioned in at least two concentric teeth rings, each of the at least two concentric teeth rings comprising at least two arced teeth of the plurality of arced teeth of the first section. Each of the plurality of teeth of the second section may be arced and positioned in at least two concentric teeth rings. Each of the at least two concentric teeth rings may comprise at least two arced teeth of the plurality of arced teeth of the second section, wherein the at least two concentric teeth rings of the second section may be positioned between the at least two concentric teeth rings of the first section and the plurality of arced teeth of the second section at least partially overlap the plurality of teeth of the first section within the grinding chamber. A width of each of the plurality of teeth of the first section and the second section may be equal to a distance between adjacent concentric teeth rings of the first section and second section. The plurality of holes in the second section floor may be arranged in at least two concentric hole rings each comprising a plurality of holes, each of the at least two concentric hole rings being aligned with each of the at least two concentric teeth rings of the first section. Each arced tooth of the plurality of teeth of the first section may comprise a V-shaped protrusion on a first end of the circular arced tooth, a crescent shaped recess on a second end of the circular arced tooth opposite the first end, and a V-shaped recess on a bottom end of the circular arced tooth opposite the top surface. Each arced tooth of the plurality of teeth of the second section may comprise a V-shaped protrusion on a first end of the circular arced tooth, a crescent shaped recess on a second end of the circular arced tooth opposite the first end, and a V-shaped shaped recess on a top end of the circular arced tooth opposite the second section floor. The plurality of teeth of the first section and the plurality of teeth of the second section may be positioned such that the V-shaped protrusions of the plurality of teeth of the first section point opposite the V-shaped protrusions of the plurality of teeth of the second section. The first section may be coupled to the second section with a first magnet positioned at a center of the top surface and a second magnet positioned at a center of the second section floor and in contact with the first magnet at a center point between the top surface and the second section floor. The at least two concentric teeth rings of the first section may comprise three concentric teeth rings each comprising four teeth. The at least two concentric teeth rings of the second section comprise two concentric teeth rings each may comprise four teeth, a first concentric teeth ring of the two concentric teeth rings of the second section being positioned between a first and a second concentric teeth ring of the three concentric teeth rings of the first section, and a second concentric teeth ring of the two concentric teeth rings being positioned between the second and a third concentric teeth ring of the three concentric teeth rings of the first section.

According to another aspect, an herb grinding device comprises a first cylindrical section and a second cylindrical section. The first cylindrical section comprises a first cavity, a top surface, and a plurality of circular arced teeth extending from the top surface within the first cavity in at least two concentric teeth rings. Each of the at least two concentric teeth rings comprise at least two circular arced teeth and each circular arced tooth of the plurality of teeth of the first cylindrical section comprises a V-shaped protrusion on a first end of the circular arced tooth, a crescent shaped recess on a second end of the circular arced tooth opposite the first end, and a V-shaped recess on a bottom end of the circular arced tooth opposite the top surface. The second cylindrical section is rotatably coupled to the first cylindrical section and comprises a second cavity facing the first cavity, a second section floor, and a plurality of circular arced teeth extending from the second section floor within the second cavity in at least two concentric teeth rings each comprising at least two circular arced teeth. Each circular arced tooth of the plurality of teeth of the second cylindrical section comprises a V-shaped protrusion on a first end of the circular arced tooth that points an opposite direction than the V-shaped protrusion of the plurality of teeth of the first cylindrical section, a crescent shaped recess on a second end of the circular arced tooth opposite the first end, and a V-shaped shaped recess on a top end of the circular arced tooth opposite the second section floor. The at least two concentric teeth rings of the second cylindrical section are positioned between the at least two concentric teeth rings of the first cylindrical section and the plurality of circular arced teeth of the second cylindrical section at least partially overlap the plurality of circular arced teeth of the first cylindrical section.

Various implementations and embodiments may comprise one or more of the following. A plurality of holes in the second section floor. The first cylindrical section may be coupled to the second cylindrical section with a first magnet positioned at a center of the top surface and a second magnet positioned at a center of the second section floor and in contact with the first magnet at a center point between the top surface and the second section floor. At least a third cylindrical section removably coupled to the second cylindrical section opposite the first cylindrical section, the at least third section comprising a collection cavity. The at least third cylindrical may comprise a third cylindrical section removably coupled to the second cylindrical section opposite the first cylindrical section, the third cylindrical section comprising a channel extending through the third cylindrical section and one or more support arms extending across the channel; and a fourth cylindrical section removably coupled to the third cylindrical section opposite the second cylindrical section. The at least two concentric teeth rings of the first cylindrical section may comprise three concentric teeth rings each comprising four teeth. The at least two concentric teeth rings of the second cylindrical section may comprise two concentric teeth rings each comprising four teeth, a first concentric teeth ring of the two concentric teeth rings of the second cylindrical section being positioned between a first and a second concentric teeth ring of the three concentric teeth rings of the first cylindrical section, and a second concentric teeth ring of the two concentric teeth rings being positioned between the second and a third concentric teeth ring of the three concentric teeth rings of the first cylindrical section, wherein a width of each of the plurality of teeth of the first section and the second section is equal to a distance between adjacent concentric teeth rings of the first section and second section.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and:

FIG. 3A is an upper exploded view of an herb grinding device;

FIG. 3B is a lower exploded view of an herb grinding device;

FIG. 6A is a top view of an exploded first and section of an herb grinding device;

FIG. 6B is a cross sectional view of an exploded first and second section of an herb grinding device taken along sectional line C-C of FIG. 6A;

DESCRIPTION

This disclosure, its aspects and implementations, are not limited to the specific components or assembly procedures disclosed herein. Many additional components and assembly procedures known in the art consistent with the intended herb grinding device and/or assembly procedures for an herb grinding device will become apparent for use with implementations of herb grinding devices from this disclosure. Accordingly, for example, although particular herb grinding devices are disclosed, such herb grinding devices and implementing components may comprise any shape, size, style, type, model, version, measurement, concentration, material, quantity, and/or the like as is known in the art for such herb grinding device and implementing components, consistent with the intended operation of an herb grinding device.

Contemplated as part of this disclosure are various embodiments of an herb grinding device that incorporate innovations, improvements and enhancements that impact the quality and process of shearing/grinding herbs, plants, botanicals and other materials into usable and preferred consistencies for various uses. As shall be described in greater detail through this disclosure, embodiments of this device may be handheld, non-electric, and/or intended to grind small quantities of material. According to some aspects, an herb grinding device of this disclosure may have multiple cylindrical sections, wherein rotation of two of the sections produces a shearing and/or grinding action as teeth pass in between one another. The floor of the second section may include a series of holes that allow the ground herbs to be separated and be stored in the third section below the second section. The third section may include a screen that filters finely ground herbs, and a fourth section separates and stores the finely ground herbs. Greater details and other configurations of each of these sections will be described below.

As shall also be described throughout this disclosure, one or more of the herb grinding devices contemplated herein are advantageous to conventional herb grinding devices by providing three different coarseness options of ground herbs due to a dual teeth edge design, reducing the force/friction required to grind herbs due to the design of radial cut teeth, increasing longevity of the device due to innovative design of the threading notches that eliminates cross threading, increasing longevity of the device due to the replaceable fine filtering screen and support for the screen by a cross brace support member, and providing a portable solution for users to manually grind small quantities of herbs while addressing all the common pit falls associated with traditional grinders.

Figure 1:
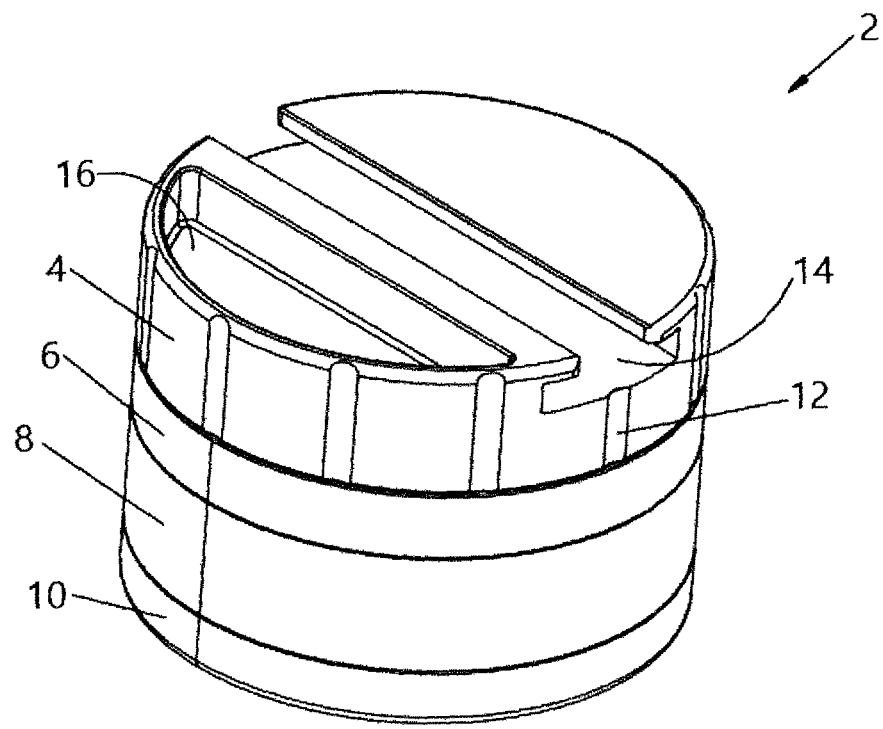
FIG. 1 is a perspective view of an herb grinding device.
Figure 4A:
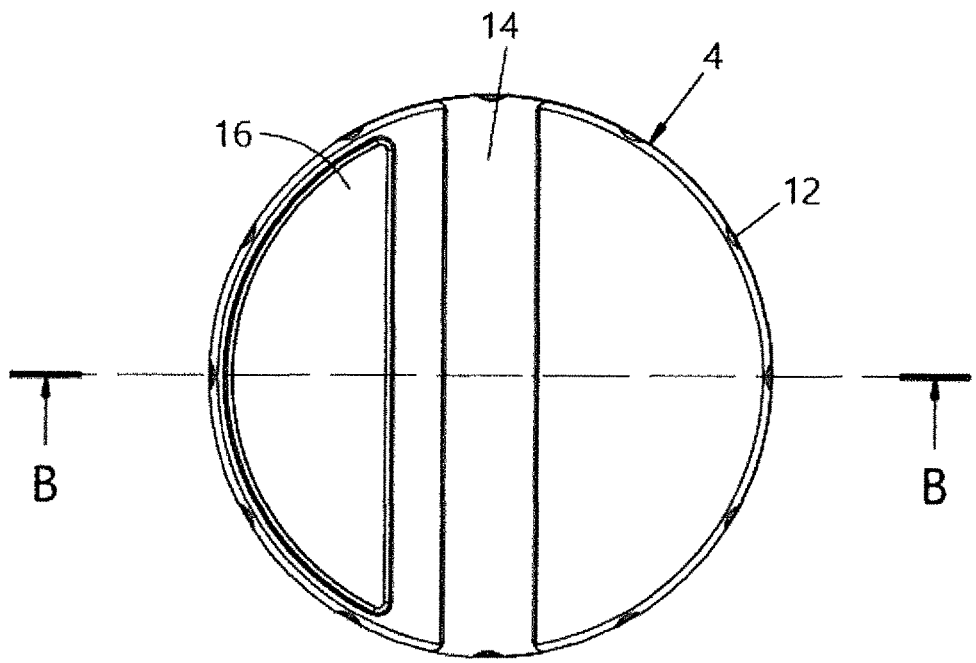
FIG. 4A is a top view of an herb grinding device.
Figure 4B:
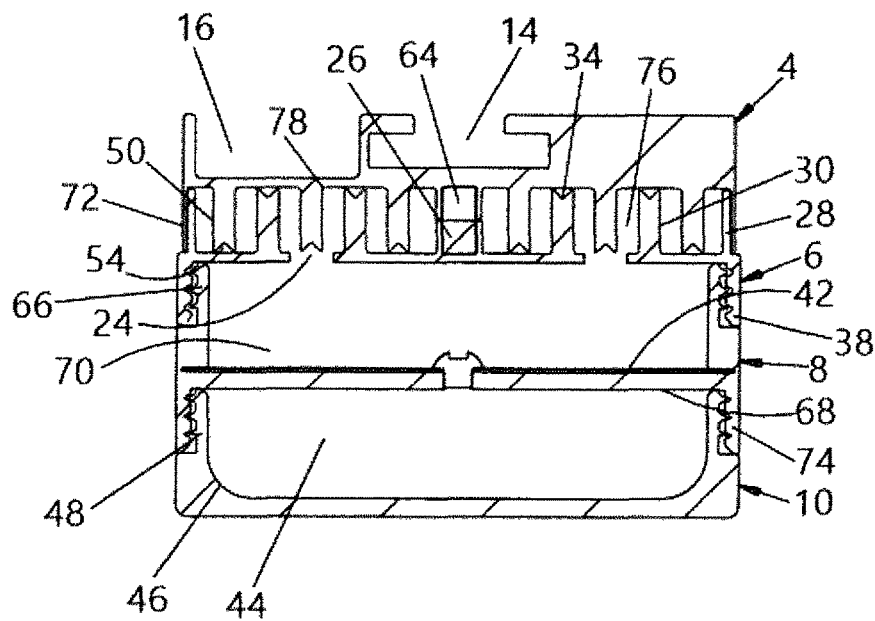
FIG. 4B is a cross-sectional view of an herb grinding device taken along sectional line 13-13 in FIG. 4A.

Contemplated as part of this disclosure are various embodiments of an herb grinding device 2. In one or more embodiments, an herb grinding device 2 is relatively lightweight and portable, and yet very strong. By way of example and not limitation, an herb grinding device 2 may be manufactured from 6061 or 7075 grade aluminum, 304 stainless, or T2 titanium. According to some aspects, an herb grinding device 2 comprises at least a first section 4 and a second section 6. Other contemplated embodiments may comprise a third section 8 and/or a fourth section 10, although these sections are not required in all embodiments. Although reference is made in this description and in the figures to substantially cylindrical sections of an herb grinding device 2, it is contemplated that the exterior of the herb grinding device 2 is not always cylindrical and may, instead, comprise any other geometric shapes and configurations. FIG. 1 provides a perspective view of a non-limiting embodiment of a herb grinding device 2 comprising a first section 4 coupled to a second section 6, a third section 8 coupled to the second section 6 opposite the first section 4, and a fourth section 10 coupled to the third section 8 opposite the second section 6. FIGS. 3A and 3B provide exploded top and bottom perspective views, respectively, and FIG. 4B provides a cross sectional view of non-limiting embodiment of an herb grinding device 2 comprising a first section 4, a second section 6, a third section 8, and a fourth section 10. Details of each of the sections shall be provided below.

In one or more embodiments, an herb grinding device 2 comprises a first section 4 rotatably and removably coupled to a second section 6. FIGS. 7A-7F depict various views of a non-limiting embodiment of a first section 4. According to some aspects, a first section 4 comprises a substantially cylindrical first section 4 having a cylindrical first cavity 62 within a portion of the cylindrical first section 4. In other embodiments, a first section may comprise other geometric configurations on the outside of the first section, and maintain a cylindrical first cavity 62 within a portion of the first section. The first cavity 62 may be bordered by circular outer wall 72 and a top surface 58, and comprise an opening opposite the top surface 58. According to some aspects, the first cavity 62 comprises a depth of between approximately 0.25" and 0.75". The outer wall 72 is sized to receive a portion of the second section 6 within the first cavity 62 or, alternatively, fit within a portion of the second section 6.

In one or more embodiments, a first section 4 comprises a plurality of teeth 50. According to some aspects, the plurality of teeth 50 extend from the top surface 58 of the first section and are positioned to form a plurality of concentric teeth rings 60, with each concentric teeth ring 60 comprising a plurality of teeth 50. In the non-limiting embodiment depicted in FIGS. 7A-7F, the first section 4 comprises three concentric teeth rings 60, with each concentric teeth ring 60 comprising four equally spaced apart teeth 50. In other embodiments, a first section 4 may comprise any number of concentric teeth rings 60 and any number of teeth 50 within each concentric teeth ring. Each concentric teeth ring 60 comprises a center aligned with a center of the first cavity 62. In the non-limiting embodiment depicted in FIG. 7B, for example, a magnet 64 is positioned at a center of the first cavity 62 of the first section 4. According to some aspects, the plurality of teeth 50 within each concentric teeth ring 60 may be aligned with the plurality of teeth 50 within each adjacent teeth ring 60. For example, in the non-limiting embodiment depicted in FIG. 7B, the four teeth 50 in each concentric ring are aligned with the four teeth in the adjacent concentric teeth ring 60, each tooth 50 within each concentric teeth ring 60 being approximately 90 degrees from the adjacent teeth of the same concentric teeth ring 60. That is, the teeth 50 of adjacent teeth rings 60 are aligned, but narrow in radial length towards a center of the first cavity 62 in a pie-shaped configuration. Thus, a pie-shaped configuration of space may exist between aligned teeth 50.

Figure 7A:
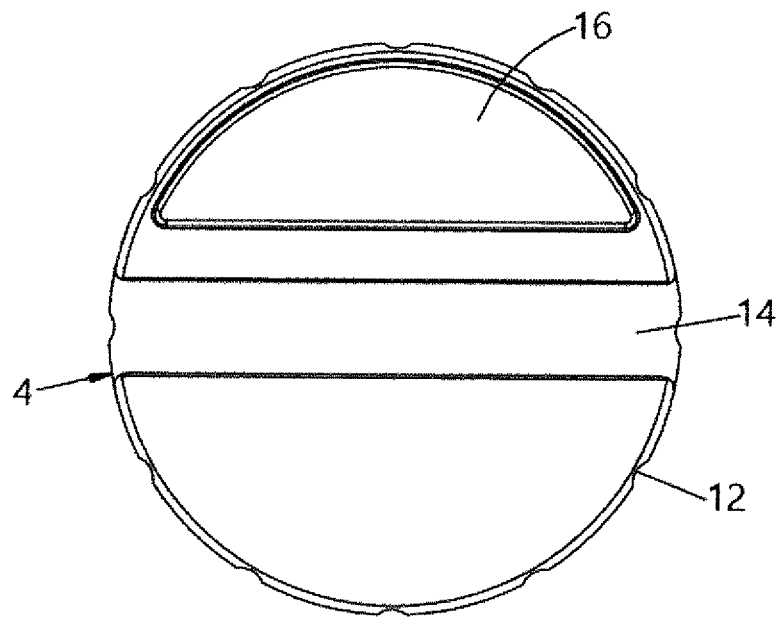
FIG. 7A is a top view of a first section of an herb grinding device.
Figure 7B:
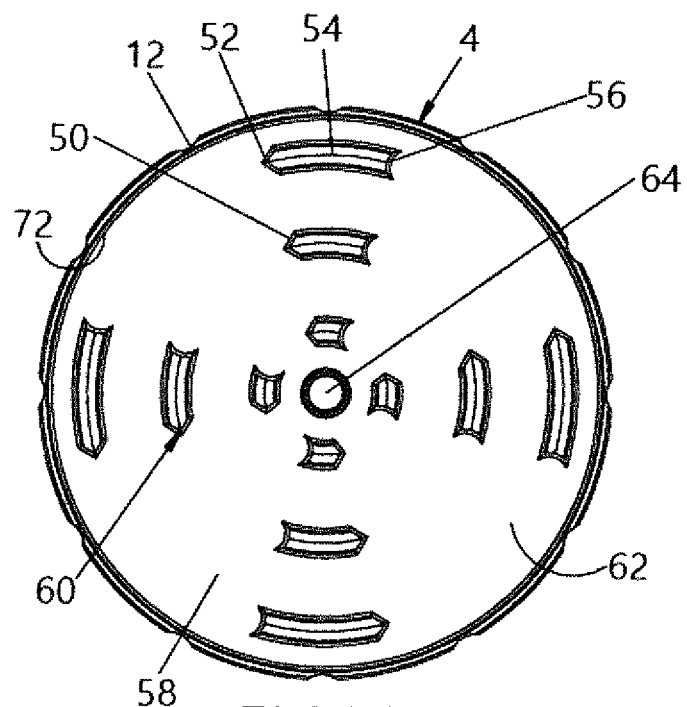
FIG. 7B is a bottom view of a first section of an herb grinding device.
Figure 7C:
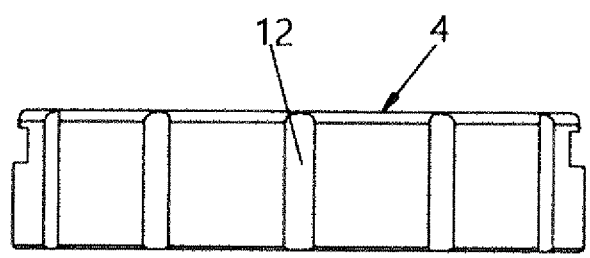
FIG. 7C is a first side view of a first section of an herb grinding device.
Figure 7D:
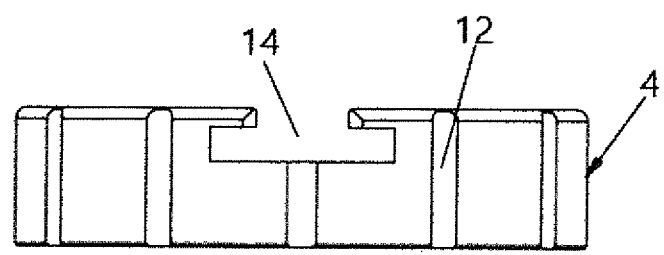
FIG. 7D is a second side view of a first section of an herb grinding device.
Figure 7E:
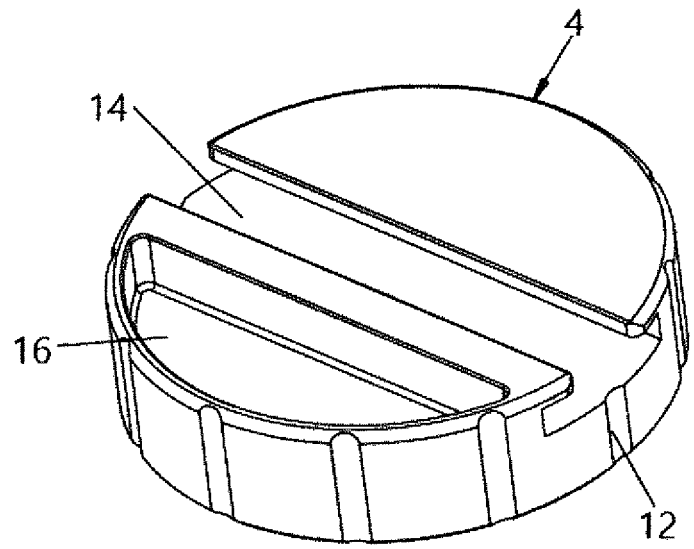
FIG. 7E is top perspective view of a first section of an herb grinding device.
Figure 7F:
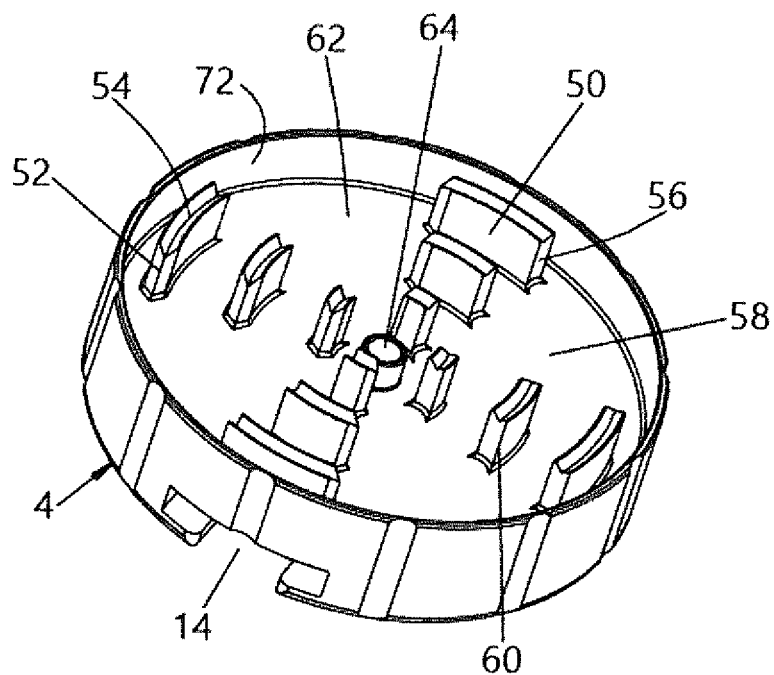
FIG. 7F is a bottom perspective view of a first section of an herb grinding device.
Figure 7G:
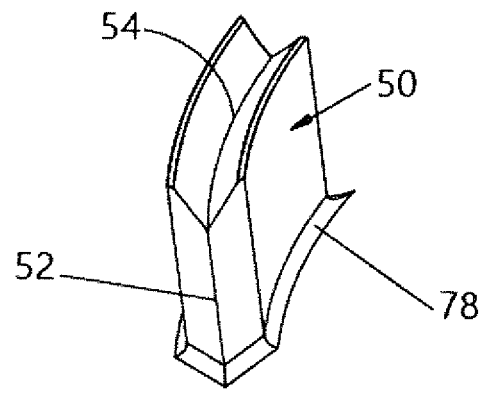
FIG. 7G is a front perspective view of a tooth of a first section of an herb grinding device.
Figure 7H:
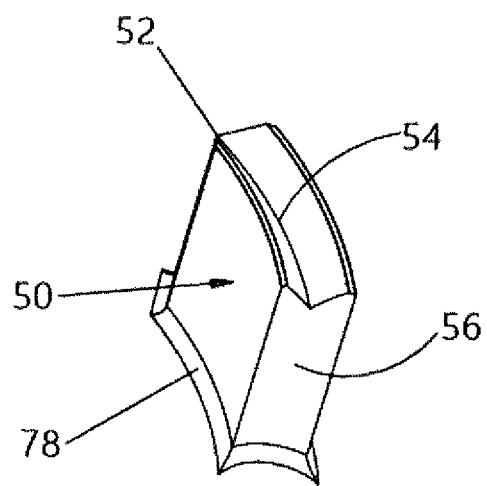
FIG. 7H is a rear perspective view of a tooth of a first section of an herb grinding device.

In one or more embodiments, each tooth 50 of the first section 4 comprises a circular arced tooth 50. More particularly, each circular arced tooth 50 may comprise a center point of the arc at a center of first cavity 62. Circular arced teeth 50 are advantageous to conventional teeth because circular arced teeth are extremely strong and unbreakable due to the curvature and elongation of the teeth 50. Conventional teeth are typically post teeth, which are prone to breaking when enough force is applied. Circular arced teeth are also more elongated teeth 50 than conventional post teeth, and allow the ground material to essentially roll between the teeth 50 and become compacted, which then allows the material to fall through the holes 24 with less effort. FIGS. 7G and 7H depict close up views of non-limiting embodiments of a circular arc tooth 50 of the first section 4. According to some aspects, each tooth 50 may comprise one or more of the following: a V-shaped protrusion 52 on a first end of the tooth 50, a crescent shaped recess 56 on a second end of the tooth 50 opposite the first end, and a V-shaped recess 54 on a bottom end of the tooth 50 opposite the top surface 58. The V-shaped recess 54 may comprise an angle of between approximately 30 degrees and 150 degrees. A V-shaped recess 54 on a bottom end of the tooth 50 assists in the shearing and/or grinding by allowing the first section 4 to be placed on to the second section 6 without the need to smash it in place. This helps slice down through the unground material rather than just smashing the sections together with brute force. The V-shaped recess 54 on a bottom end of the tooth 50 also reduces the amount of ground material sticking to the interior of the first cavity 62 and the second cavity 22 by reducing surface area contact.

In the non-limiting embodiment depicted in FIGS. 7G and 7H, each tooth comprises a V-shaped protrusion 52 on a first end of the tooth 50, a crescent shaped recess 56 on a second end of the tooth 50 opposite the first end, and a V-shaped recess 54 on a bottom end of the tooth 50 opposite the top surface 58. According to some aspects, each tooth 50 in each concentric teeth ring 60 extends approximately 30 degrees along the respective teeth ring 60. In some embodiments, a width of each tooth of the plurality of teeth 50 may be between approximately 0.050" and 0.150". The V-shaped portion of each recess or protrusion may be sharp and angular or, alternatively, partially rounded. In one or more embodiments, each tooth 50 may comprise a radiused edged 78 at a base of the tooth 50 where the tooth 50 intersects the top surface 58, thus providing additional strength to the tooth 50.

In one or more embodiments, rotatable coupling of a first section 4 to a second section 6 is enhanced or strengthened by a magnet 64 at the center of the first cavity 62, such as but not limited to a neodymium magnet. The magnet 64 may be magnetically attracted to metal of the second section 6 or, alternatively a magnet 26 positioned at a center of the second section 6. Magnetic coupling of the first section 4 and the second section 6 is advantageous because it prevents the sections from separating during rotation of the first section and grinding, while still allowing for easy and quickly removal of the first section 4 from the second section 6 to insert herbs into the grinding device 2. More particularly, each magnet 64, 26 may be held in place on the respective first section 4 or second section by a magnet boss on each section. In some embodiments, a magnet boss of the second section 6 is equal distance from the second section floor 20 as a magnet boss of the first section 4 is from the top surface 58. This allows the magnets 64, 26 to meet and contact each other a center point between the top surface 58 and the second section floor 20. Such a configuration inhibits material from getting stuck between the magnets and weakening the magnetic coupling between the magnets 64, 26. In other embodiments, any other coupling devices known in the art may be utilized.

In one or more embodiments, a first section 4 may comprise at least one of a recessed outer cavity 16, a T-shaped slot 14, and a plurality of gripping slots 12. The recessed outer cavity 16 is positioned on an outside of the first section 4 opposite the first cavity 62 and may be sized to function as an ash tray on the herb grinding device 2. According to some aspects, the recessed outer cavity comprises a width approximately one-third a diameter of the first section 4. Although the embodiment depicted in FIG. 7A comprises only a single recessed outer cavity 16, it is contemplated that some embodiments may comprise two recessed outer cavities 16, with a T-shaped slot being positioned between the two recessed outer cavities 16. A t-shaped slot 14 may be sized to allow for a standard rolling papers sleeve package to be held in place within the T-slot. This allows rolling papers to be dispensed through the top surface of the first section 4. This helps prevent loss or misplacement of the rolling papers by the user. One or more embodiments of a first section 4 further comprise gripping elements, such as but not limited to a plurality of gripping slots 12 on an outer circumference of the first section 4. The gripping slots 12 allow for a more natural grip of the hand and fingers. Thus, a user need apply significantly less pressure when rotating the lid as compared to the conventional knurl style grip.

As previously noted an herb grinding device 2 of this disclosure may further comprise a second section 6 rotatably coupled to a first section 4. FIGS. 8A-8E depict a non-limiting embodiment of a second section 6. According to some aspects, a second section 6 comprises a substantially cylindrical second section 6 having a cylindrical second cavity 22 within a portion of the cylindrical second section 6. In other embodiments, a second section may comprise other geometric configurations on the outside of the second section, and maintain a cylindrical second cavity 22 within a portion of the second section. The second cavity 22 may be bordered by annular flange 28 and a second section floor 20, and comprise an opening opposite the second section floor 20. According to some aspects, a second cavity 22 comprises a depth between approximately 0.25" and 0.75". The annular flange 28 according to some aspects is sized to fit within the first cavity 62 and interface with or be adjacent to the outer wall 72 of the first section 72. This configuration allows the first section 4 to rotate freely about the annular flange 28 in either direction. This configuration also reduces residue buildup and accumulation because the annular flange 28 fits within the first section 4. Accordingly, a slight space may exist between the interfaced outer wall 72 and annular flange 28 to allow rotation of the first section 4 relative to the second section 6. In other embodiments, the annular flange 28 is sized to receive a portion of the first section 4 to allow rotation of the first section 4 within the second cavity 22.

In one or more embodiments, a second section 6 comprises a plurality of teeth 30. According to some aspects, the plurality of teeth 30 extend from second section floor 20 within the second cavity 22 of the second section 6 and are positioned to form a plurality of concentric teeth rings 40, with each concentric teeth ring 40 comprising a plurality of teeth 30. In the non-limiting embodiment depicted in FIGS. 8A-8E, the second section 6 comprises two concentric teeth rings 40, with each concentric teeth ring 40 comprising four equally spaced apart teeth 30. In other embodiments, a second section 6 may comprise any number of concentric teeth rings 40 and any number of teeth 30 within each concentric teeth ring 40. Each concentric teeth ring 40 comprises a center aligned with a center of the second cavity 22. In the non-limiting embodiment depicted in FIG. 8A, for example, a magnet 26 is positioned at a center of the second cavity 22 of the second section 6. According to some aspects, the plurality of teeth 30 within each concentric teeth ring 40 may be aligned with the plurality of teeth 30 within each adjacent teeth ring 40. For example, in the non-limiting embodiment depicted in FIG. 8A, the four teeth 30 in each concentric ring 40 are aligned with the four teeth 30 in the adjacent concentric teeth ring 40, each tooth 30 within each concentric teeth ring 40 being approximately 90 degrees from the adjacent teeth of the same concentric teeth ring 40. That is, the teeth 30 of adjacent teeth rings 40 are aligned, but narrow in radial length towards a center of the second cavity 22 in a pie-shaped configuration. Thus, a pie-shaped configuration of space may exist between aligned teeth 30.

Figure 8A:
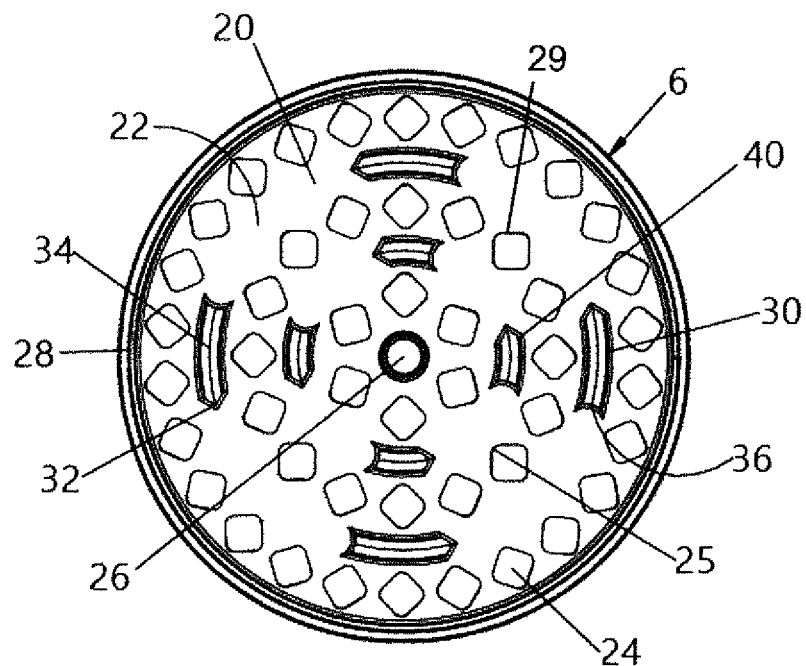
FIG. 8A is a top view of a second section of an herb grinding device.
Figure 8B:
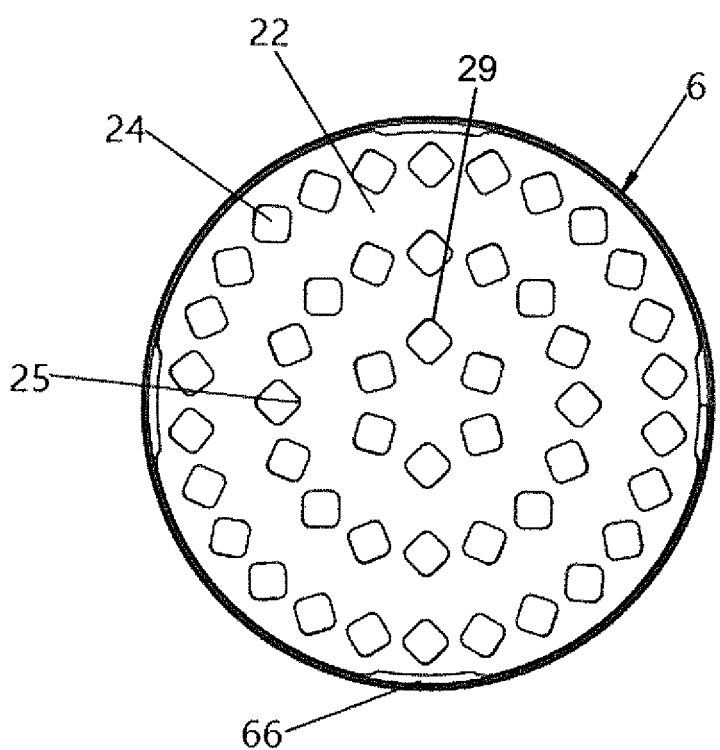
FIG. 8B is a bottom view of a second section of an herb grinding device.
Figure 8C:
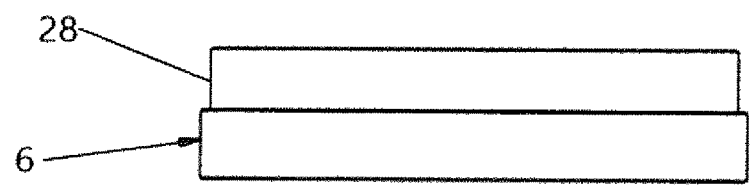
FIG. 8C is a side view of a second section of an herb grinding device.
Figure 8D:
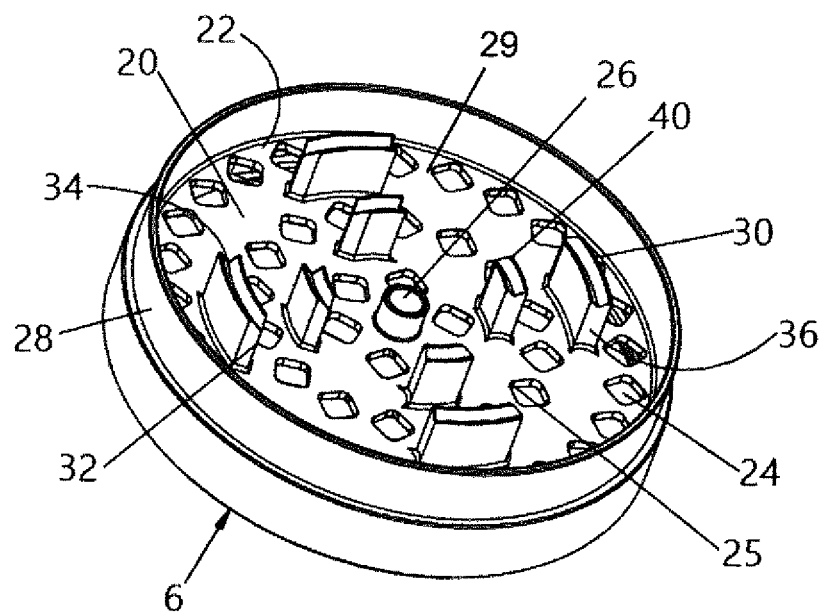
FIG. 8D is a top perspective view of a second section of an herb grinding device.
Figure 8E:
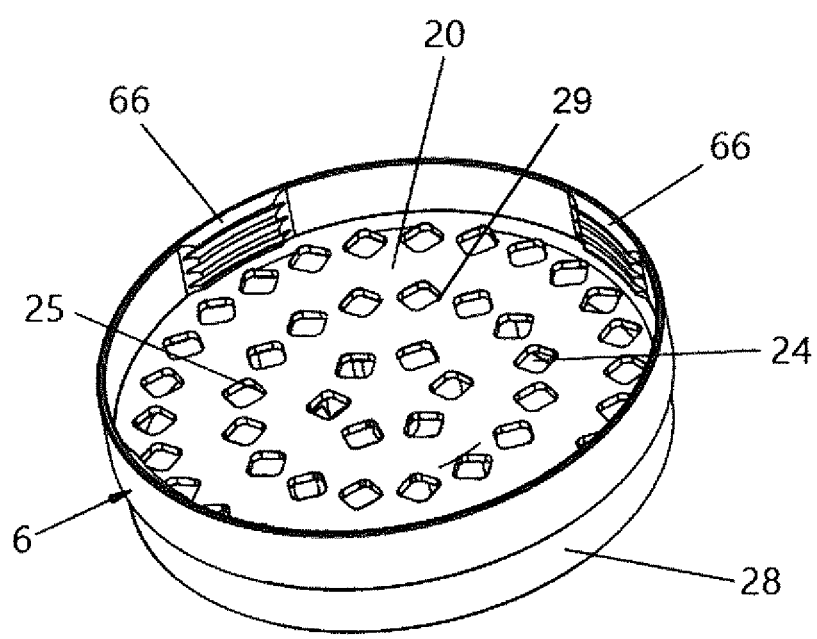
FIG. 8E is a bottom perspective view of a second section of an herb grinding device.
Figure 8F:
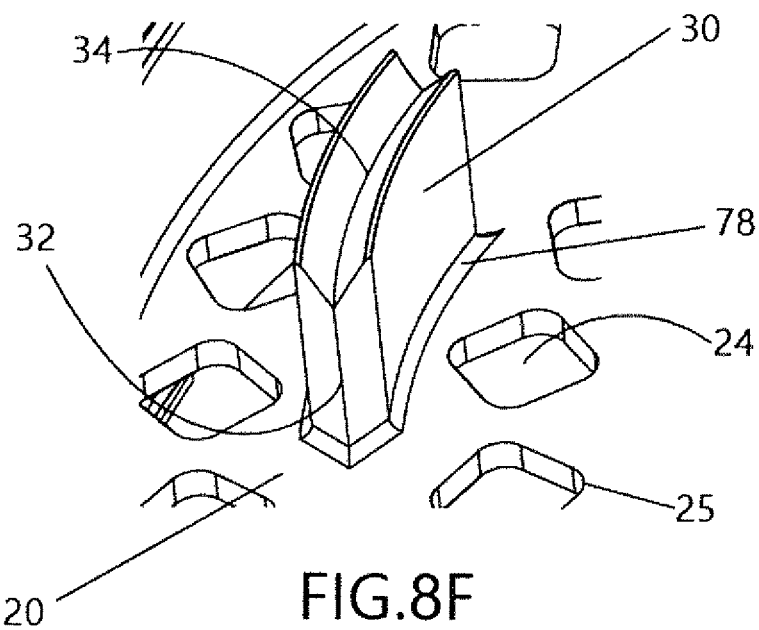
FIG. 8F is a front perspective view of a tooth of a second section of an herb grinding device.
Figure 8G:
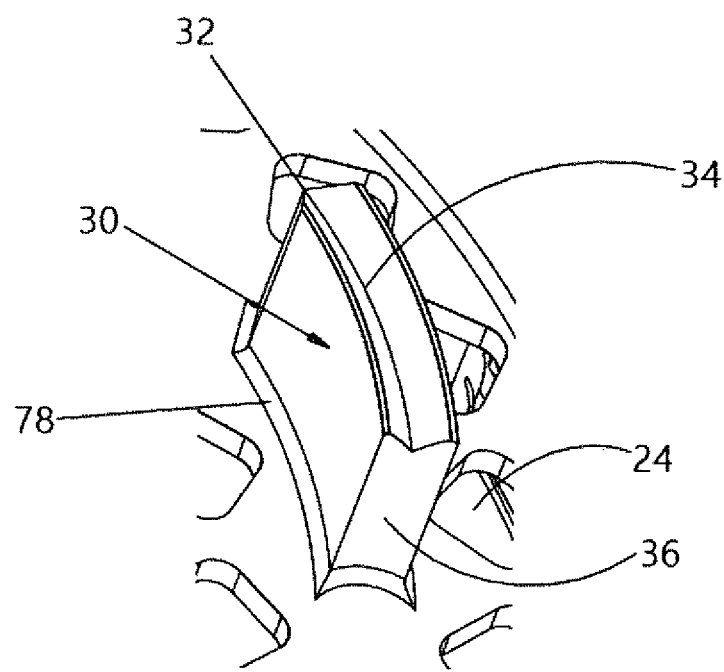
FIG. 8G is a rear perspective view of a tooth of a second section of an herb grinding device.

In one or more embodiments, each tooth 30 of the second section 6 comprises a circular arced tooth 30. More particularly, each circular arced tooth 30 may comprise a center point of the arc at a center of second cavity 22. FIGS. 8F and 8G depict close up views of non-limiting embodiments of a circular arc tooth 30 of the second section 6. According to some aspects, each tooth 30 may comprise one or more of the following: a V-shaped protrusion 32 on a first end of the tooth 30, a crescent shaped recess 36 on a second end of the tooth 30 opposite the first end, and a V-shaped recess 34 on a top end of the tooth 30 opposite the second section floor 20. A V-shaped recess 34 on a top end of the tooth 30 assists in the shearing and/or grinding by allowing the second section 6 to be placed into the first section 4 without the need to smash it in place. The V-shaped recess 34 may comprise an angle of between approximately 30 degrees and 150 degrees. This helps slice down through the unground material rather than just smashing the sections together with brute force. The V-shaped recess 34 on a top end of the tooth 30 also reduces the amount of ground material sticking to the interior of the first cavity 62 and the second cavity 22 by reducing surface area contact.

In the non-limiting embodiment depicted in FIGS. 8F and 8G, each tooth 30 comprises a V-shaped protrusion 32 on a first end of the tooth 30, a crescent shaped recess 36 on a second end of the tooth 30 opposite the first end, and a V-shaped recess 34 on a top end of the tooth 30 opposite the second section floor 20. According to some aspects, each tooth 30 in each concentric teeth ring 40 extends approximately 30 degrees along the respective teeth ring 40. More particularly, a width of each tooth of the plurality of teeth 30 may be between approximately 0.050" and 0.150". The V-shaped portion of each recess or protrusion may be sharp and angular or, alternatively, partially rounded. In one or more embodiments, each tooth 30 comprises a radiused edged 78 at a base of the tooth 30 where the tooth 30 intersects the second section floor 20, thus providing additional strength to the tooth 30. In some, non-limiting embodiments, the plurality of teeth 50 of the first section 4 and the plurality of teeth 30 of the second section 6 are positioned on their respective sections such that the V-shaped protrusions 52 of the plurality of teeth 50 of the first section 4 point opposite the V-shaped protrusions 32 of the plurality of teeth 30 of the second section 6.

According to some aspects, a width of each of the plurality of teeth 30, 50 of the first section 4 and the second section 6 is equal to a distance between adjacent concentric teeth rings 40, 60 of the first section 4 and second section 4. For example, in some embodiments, a width of each tooth of the plurality of teeth 30, 50 may comprise a width of approximately 0.10". In such an embodiment, a gap or distance between the plurality of teeth 50 on a first concentric teeth ring 60 of the first section 4 and the plurality of teeth 30 on an adjacent first concentric teeth ring 40 of the second section 6 is approximately 0.10". Even more particularly, a gap or distance between the magnet boss of each section is also equal to a width of the plurality of teeth 30, 50, and a gap or distance between the outer most centric teeth ring is also equal to a width of the plurality of teeth 30, 50. Such a configuration is advantageous because it results in the exact same consistency when grinding herbs, which is highly desirable. It also ensures an even distribution of ground matter passing in-between the plurality of teeth 30, 50.

Figure 2:
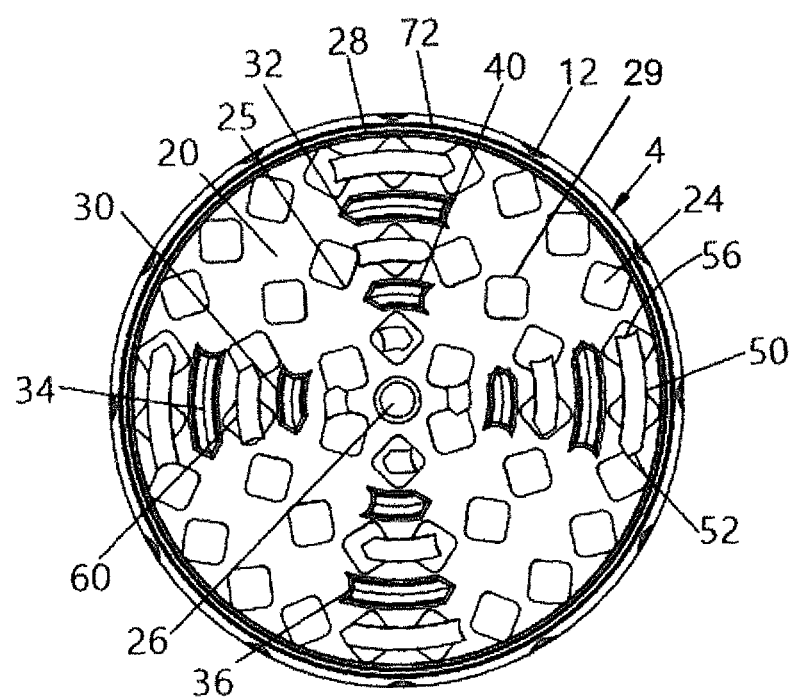
FIG. 2 is a top view of an herb grinding device with a top wall of a first section removed to provide an interior view of the grinding chamber of the herb grinding device.

In one or more embodiments, rotatable coupling of a first section 4 to a second section 6 is enhanced or strengthened by a magnet 26 at the center of the second cavity 22. The magnet 26 may be magnetically attracted to metal of the first section 4 or, alternatively, a magnet 64 positioned at a center of the first section 4. FIG. 2 depicts one such non-limiting embodiment of an herb grinding device 2 wherein the V-shaped protrusions 32 of the plurality of teeth 30 of the second section 6 point in a counter-clockwise direction, while the V-shaped protrusions 52 of the plurality of teeth 50 of the first section 4 point in a clockwise direction. Configuration of the teeth 30, 50 in this manner allows for three different coarseness consistencies of ground herbs: coarse, medium, and fine. For example, a clockwise rotation results in a rough coarseness grind and utilizes the V-shaped protrusions 32, 52 of the teeth 30, 50. A counter-clockwise rotation results in a fine coarseness grind and utilizes the crescent recesses 36, 56 of the teeth 30, 50. A combination of both counter clockwise and clockwise rotations results in a medium coarseness grind and utilizes both edges of the teeth 30, 50. This is unique and different from any other grinder as the traditional grinders only employ one cutting edge, thus resulting in only a single coarseness consistency.

In one or more embodiments, each second section 6 comprises a plurality of holes 24 in the second section floor 20. The plurality of holes 24 may be configured to allow ground herbs to be separated and fall through to the third section 8 and/or fourth section 10 typically positioned below the second section 6. According to some aspects, the plurality of holes 24 are arranged in a plurality of concentric hole rings 29 each comprising a plurality of holes 24. In the non-limiting embodiment depicted in FIGS. 8D & 8E, the second section 6 comprises three concentric hole rings 29 each comprising a plurality of holes 24. More particularly, the plurality of concentric teeth rings 40 may be alternately positioned between the plurality of concentric hole rings 29. For example, the non-limiting embodiment depicted in FIGS. 8D & 8E comprises the following concentric rings, working outward from the center magnet 26 of the second section floor: a first concentric hole ring between the center magnet 26 and a first concentric teeth ring, the first concentric teeth ring between the first concentric hole ring and the second concentric hole ring, the second concentric hole ring between the first concentric teeth ring and a second concentric teeth ring, the second concentric teeth ring between the second concentric hole ring and a third concentric hole ring, and the third concentric teeth ring between the second concentric teeth ring and the annular flange 28. Other embodiments may additional or few alternating concentric teeth and hole rings.

In one or more embodiments, the plurality of concentric hole rings 29 of the second section 6 is positioned to align with the plurality of concentric teeth rings 60 of the first section 4. More particularly, the teeth 50 of the first section 4 may be perfectly positioned on a centerline of a hole 24 of a concentric hole ring 29. This allows for the ground material to pass through the holes in a more efficient manner and allows for creation of a pinch point during grinding. FIG. 2 depicts a non-limiting embodiment of an herb grinding device 2 with a top surface 58 removed to view the grinding chamber 85 of the herb grinding device 2. By way of example and not limitation, FIG. 2 depicts each of the three concentric teeth rings 60 of the first section 4 aligning with a different one of the plurality of concentric hole rings 29 of the second section. According to some aspects, a distance between each concentric teeth ring 40 of the second section 6 and an adjacent concentric teeth ring 60 of the first section 4 is between approximately 0.050" and 0.150" inches when the first section 4 and the second section 6 are rotatably coupled together. It is noted that the aligned and circular arced teeth 30, 50 reduce the shearing and/or grinding friction of conventional systems by allowing smooth lid rotation while slicing the material. Conventional grinding teeth mash and tear, while the circular arced teeth 30, 50 contemplated herein shear and slice, resulting in reduced friction. Such a configuration also helps maintain the integrity of tricombs found on herbal material, which results in a more desirable grinding and/or shearing methodology as it properly prepares the herbs for use without destroying them.

Embodiments of a second section 6 may comprise a plurality of holes 24 of any of a number of shapes and configurations. According to some aspects, each of the plurality of holes 24 may be substantially square shaped, including having rounded corners on the square hole. Square shaped holes 24 may be advantageous to other shapes by allowing the teeth 30, 50 edges to create a pinch point against the square shaped holes 24 to further reduce friction and increase grinder efficiency. Conventional grinders utilize round holes or slots, which do not help the shearing and grinding efficiency because a pinch point is non-existent on a curved or rounded hole. Even more particularly, the plurality of holes 24 may be positioned on the second section floor 20 such that a corner 25 of each of the plurality of holes is pointing or otherwise directed to a center, such as the center magnet 26, of the second section floor 20. In other embodiments, the plurality of holes 24 may comprise other shapes and configurations, such as but not limited to diamond, star, pentagon, hexagon, or triangle.

Figure 5A:
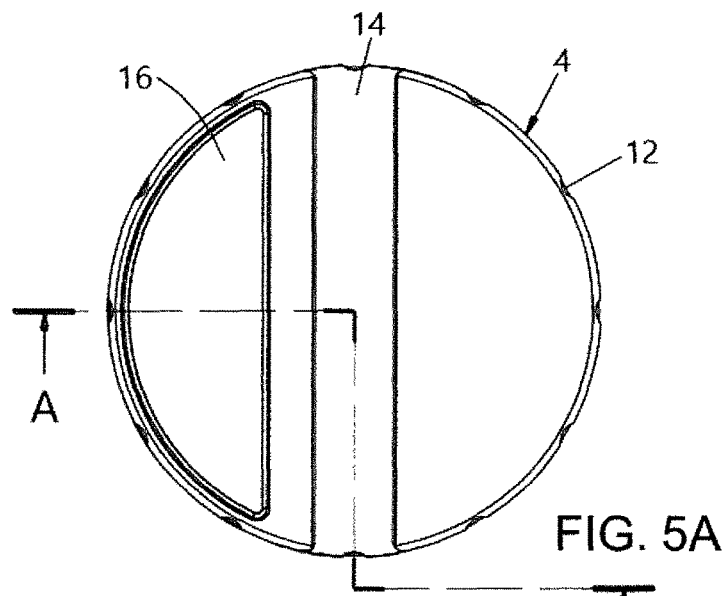
FIG. 5A is a top view of a first and second section of an herb grinding device
Figure 5B:
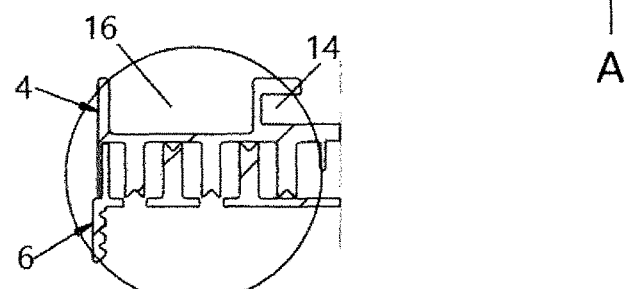
FIG. 5B is a cross sectional view of a first and second section of an herb grinding device taken along sectional line A-A of FIG. 5A.
Figure 5C:
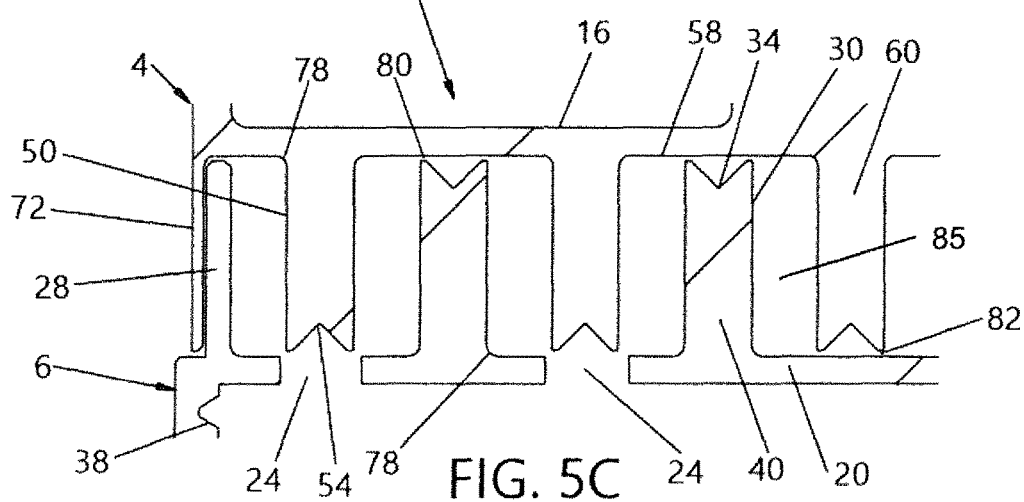
FIG. 5C is an enlarged cross sectional view of the circled portion of FIG. 5B.

FIGS. 4B and 5C depict cross sectional views that include a grinding chamber 85 formed by the alignment of a first cavity 62 of a first section 2 and a second cavity 22 of a second section 6. In one or more embodiments, the first cavity 62 and the second cavity 22 are sized such that a small gap 82 exists between the bottom of the plurality of teeth 50 of the first section 4 and the second section floor 2, and a small gap 80 exists between the top of the plurality of teeth 30 of the second section 6. According to some aspects, each gap 80, 82 is approximately 0.010". Such a configuration allows for a shearing and grinding of herbs within a grinding chamber 85 as a first section 4 is rotated relative to a second section 6. The gaps 80, 82 also reduces the build up and accumulation of residue, which eventually clogs the grinding chamber 85. Furthermore, the gaps 80, 82 may also ensure the magnets 26, 64 holding the first section 4 and the second section 6 together remain coupled, thus ensuring a strong magnetic coupling or seal. The teeth of conventional grinders drag directly on the interior cavity floors, which result in the employment of a thick plastic lid ring to elevate the teeth from the floor. This, in turn, does not allow for a magnetic coupling and results in a weaker seal or coupling of the section. Thus, configurations contemplated herein eliminate the need for a thick plastic lid ring typically employed on all other grinders.

In one or more embodiments, a second section 6 is removably coupled to a third section 8. According to some aspects, a second section 6 is threadedly and removably coupled to a third section 8. Even more particularly, a second section 6 may be threadedly coupled to a third section 8 with a plurality of threading notches 66. For example, the non-limiting embodiment depicted in FIGS. 8B and 8E comprises four relief threading notches 66 configured to engage with relief threading notches 38 of the third section 8. The threading notches 66 of the second section 6 may be positioned on an inner surface of the second section 6 below the second section floor 20 and opposite the second cavity 22, while the threading notches 38 of the third section 8 may be positioned on at outer surface of an annular flange of the third section 8 that fits within the second section 6. In other embodiments, the threading notches 66 of the second section 6 may be positioned on an outer surface that fits within a portion of the third section 8. Removably coupling via the four threading notches 66, 38 allows for separation or coupling of the second section 6 and the third section 8 quicker than a conventional thread that has to be unscrewed and rotated multiple times before being completely coupled or uncoupled. Utilization of four relief threading notches allows a standard UNF thread to be conjoined and un joined without the need to continuously rotate the respective sections. Instead, sections may be coupled or uncoupled with a simple one-quarter turn of one of the sections. According to some aspects, the threading notches 38, 66 comprise a low threads per inch (TPI), such as but not limited to a 12-6 TPI. In one or more embodiments, the female side threading notches contemplated in this disclosure is separated into eight segments that alternate evenly between thread-gap-thread-gap. The gaps in the female connection of the quick lock thread serve as relief for coupling the male side of the adjacent section.

Figure 9A:
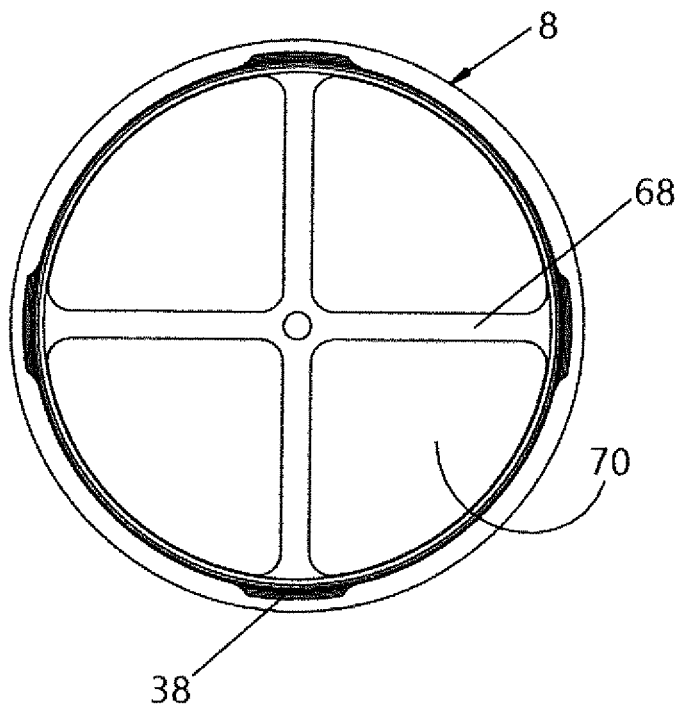
FIG. 9A is a top view of a third section of an herb grinding device.
Figure 9B:
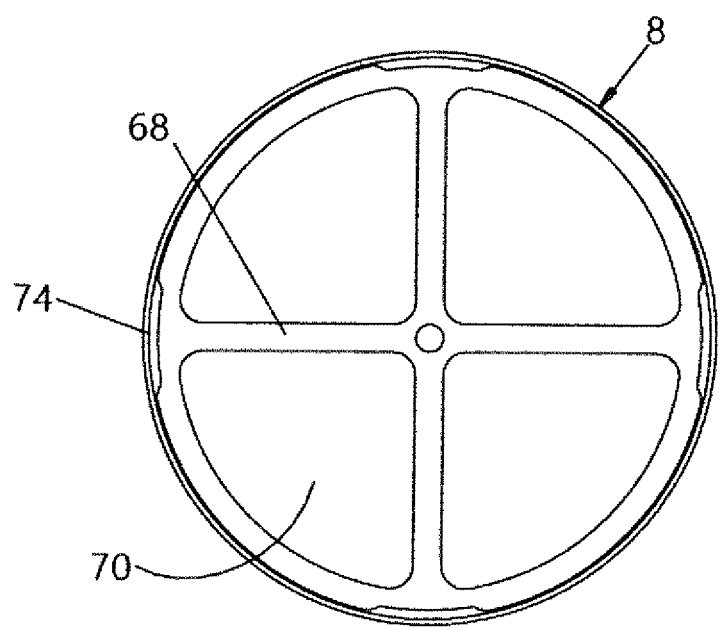
FIG. 9B is a bottom view of a third section of an herb grinding device.
Figure 9C:
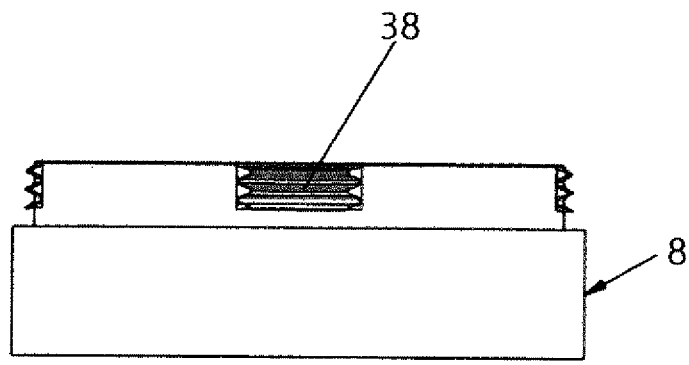
FIG. 9C is a side view of a third section of an herb grinding device.
Figure 9D:
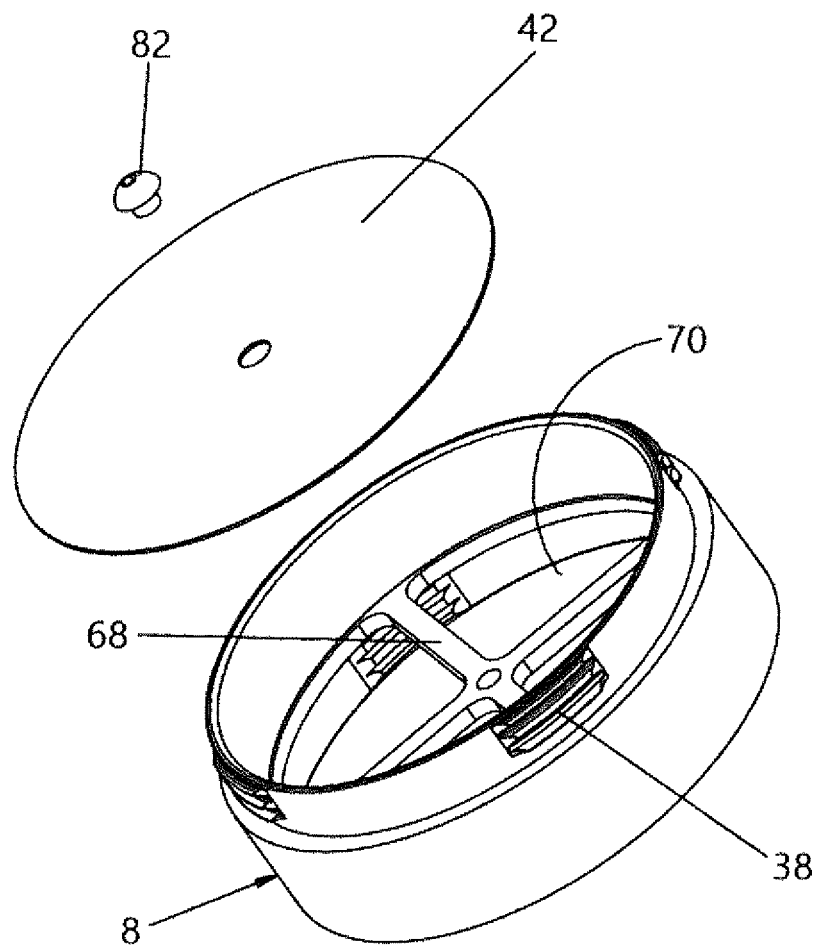
FIG. 9D is an exploded view of a third section of an herb grinding device.
Figure 9E:
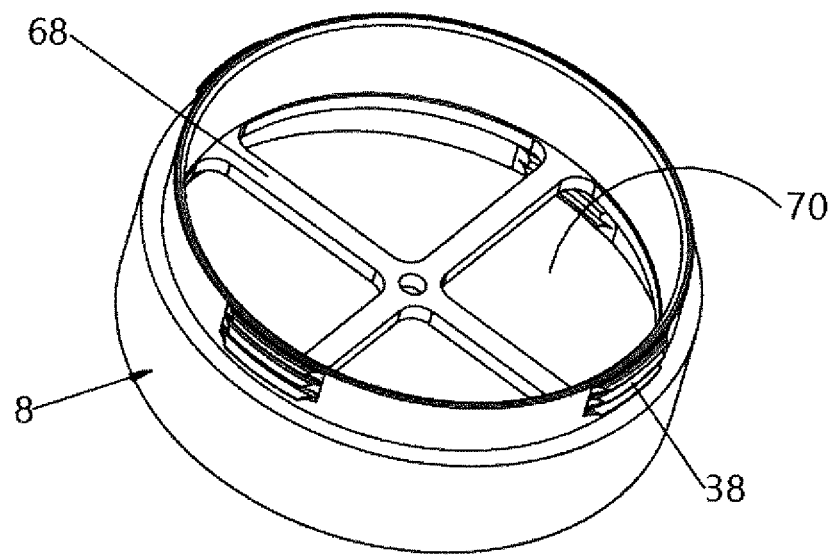
FIG. 9E is a perspective view of a third section of an herb grinding device without a screen.
Figure 10A:
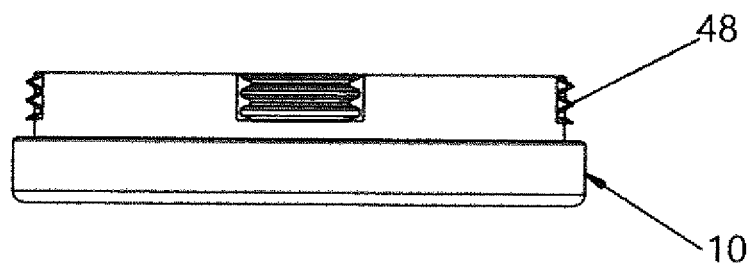
FIG. 10A is a side view of a fourth section of an herb grinding device.
Figure 10B:
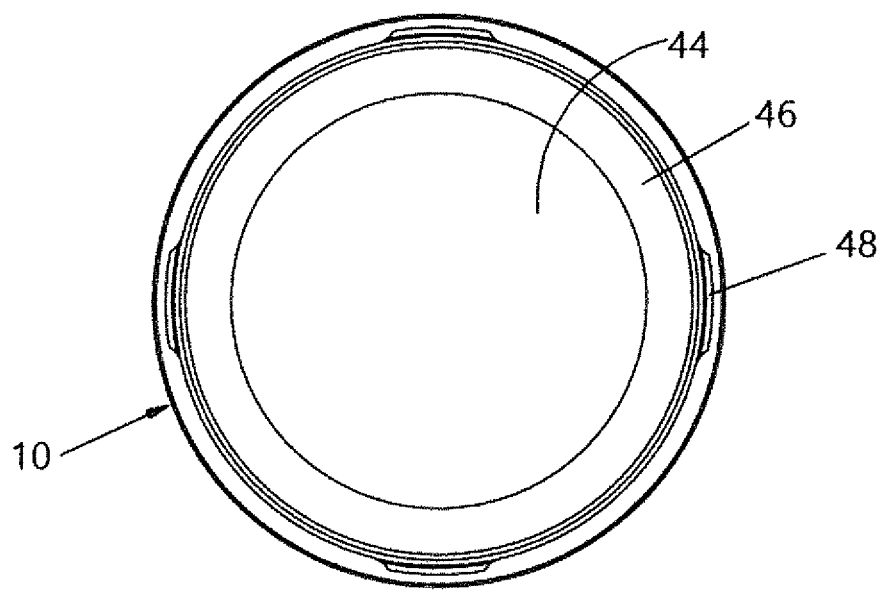
FIG. 10B is a top view of a fourth section of an herb grinding device.
Figure 10C:
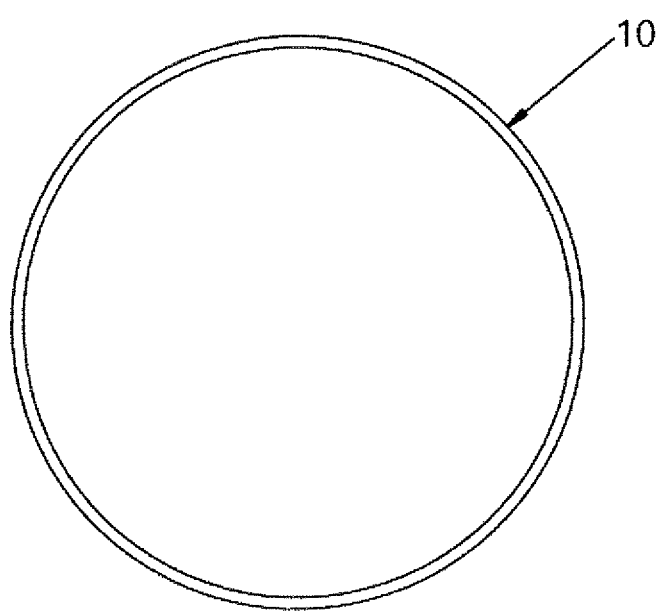
FIG. 10C is a bottom view of a fourth section of an herb grinding device.
Figure 10D:
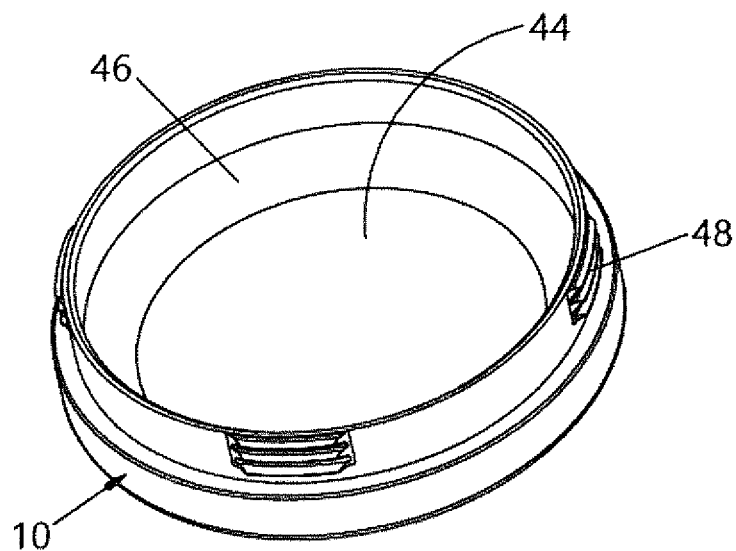
FIG. 10D is a top perspective view of a fourth section of an herb grinding device.
Figure 10E:
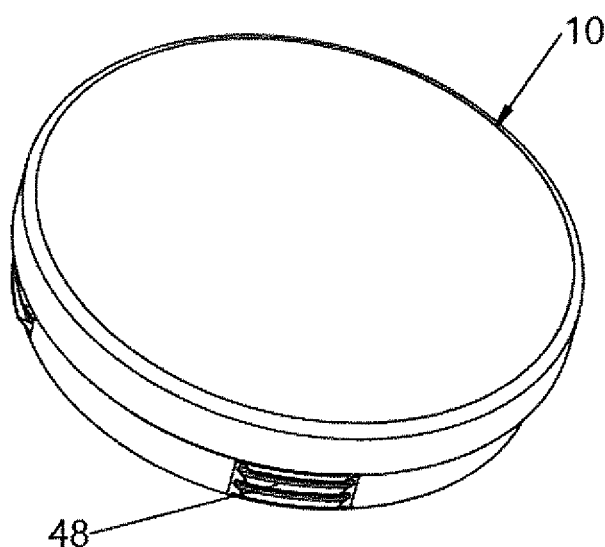
FIG. 10E is a bottom perspective view of a fourth section of an herb grinding device.

FIGS. 9A-9E depict various view of a non-limiting embodiment of a third section 8 of an herb grinding device 2. A third section 8 may be configured to filter finely ground herbs. According to some aspects, a third section 8 comprises a channel 70 extending through a cylindrical third section 8 and on or more support arms 68 extending across the channel 70. In some embodiments, the one or more support arms 68 comprise a cross brace support arms 68. Cross brace support arms 68 may be configured to support a bottom surface of a screen 42 coupled to the cross brace support arms 68 with a screw 82 such that the screen 42 is positioned within the channel 70. FIG. 9D provides an exploded perspective view of a third section 8 comprises a screen 42, and FIG. 3A provides a perspective view of a third section 8 with a screen 42 coupled to the cross brace support arms 68 in the third section 8. The screen may comprise one of a fine, medium, or coarse woven mesh, stainless steel, or titanium. An outer edge of a screen 42 may be held in place within the third section 8 with a small groove on an inner surface of the channel 70 just above the cross brace support arms 68. Utilizing one or more support arms 68, such as cross brace support arms 68 is advantageous to conventional devices because the support arms 68 support the screen 42, rather than unsupported screens stretched across the device like a drum in conventional systems. Such conventional mounting of a screen results in tearing and stretching of the screen over time. In contrast, support of the screen 42 with support arms 68 prevents stretch and tearing, and allows for easy replacement of the screen 42.

As previously noted, a third section 8 may comprise threading notches 38 on an annular flange of the third section 8 for coupling of the third section 8 to a second section 6. According to some aspects, a third section 8 is threadedly and removably coupled to a fourth section 10. Even more particularly, a third section 8 may be threadedly coupled to a fourth section 10 with a plurality of threading notches 74. For example, the non-limiting embodiment depicted in FIG. 9B comprises four relief threading notches 74 configured to engage with relief threading notches 48 of the fourth section 10. The threading notches 74 of the third section 8 may be positioned on an inner surface of the third section 8 below the support arms 68, while the threading notches 48 of the fourth section 10 may be positioned on at outer surface of an annular flange of the fourth section 10 that fits within the third section 8. In other embodiments, the threading notches 74 of the third section 8 may be positioned on an outer surface that fits within a portion of the fourth section 10. Removably coupling via the four threading notches 74, 48 allows for separation or coupling of the third section 8 and the fourth section 10 quicker than a conventional thread that has to be unscrewed and rotated multiple times before being completely coupled or uncoupled. Utilization of four relief threading notches allows a standard UNF thread to be conjoined and un-joined without the need to continuously rotate the respective sections. Instead, sections may be coupled or uncoupled with a simple one-quarter turn of one of the sections. According to some aspects, the threading notches 74, 48 comprise a low threads per inch (TPI), such as but not limited to a 12-6 TPI.

FIGS. 10A-E depict various views of a non-limiting embodiment of a fourth section 10 of an herb grinding device. A fourth section 10 may be configured to store finely ground particles and/or pollen. As previously noted, a fourth section 10 is configured to be removably coupled to a third section 8. The fourth section 10 may couple to the third section 8 with threading notches 48. In one or more embodiments, a fourth section 10 comprises a collection cavity 44. The collection cavity 44 is configured to collect the grindings of herbs ground in the grinding chamber 85 of the first section 4 and the second section 6. According to some aspects, the collection cavity 44 comprises a radiused edge 46. The radiused edge 46 of the collection cavity 44 allow for easy removal of finely filtered particles and solves the traditional problem of particles getting trapped in the corners of a collection cavity. This configuration allows for a standard guitar pick to contour the radiused edge 46 of the collection cavity 44 to assist in fine pollen removal. It is also configured for use of a finger to remove or scoop the particles from the collection cavity 44. It is further contemplated that the fourth section 10 comprising a collection cavity 44 may be removably coupled to the second section 6 comprising a second section floor as previously described. That is, in some embodiments, a third section 8 is not necessary. Coupling of the fourth section 10 to the second section 6 may be similar to the coupling of a third section 8 to a second section 6.

It will be understood that implementations are not limited to the specific components disclosed herein, as virtually any components consistent with the intended operation of a method and/or system implementation for herb grinding devices may be utilized. Accordingly, for example, although particular herb grinding devices may be disclosed, such components may comprise any shape, size, style, type, model, version, class, grade, measurement, concentration, material, weight, quantity, and/or the like consistent with the intended operation of a method and/or system implementation for an herb grinding device may be used.

In places where the description above refers to particular implementations of an herb grinding device, it should be readily apparent that a number of modifications may be made without departing from the spirit thereof and that these implementations may be applied to other herb grinding devices. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. An herb grinding device, comprising:
a first cylindrical section comprising a first cavity, a top surface, and, a plurality of teeth extending from the top surface within the first cavity;
a second cylindrical section coupled to the first cylindrical section and comprising a second cavity facing the first cavity, a second section floor, a plurality of holes formed through the second section floor, and a plurality of teeth extending from the second section floor within the second cavity; wherein the plurality of teeth of the second cylindrical section are positioned between the plurality of teeth of the first cylindrical section;
a third cylindrical section removably coupled to the second cylindrical section, the third cylindrical section comprising a collection cavity; and
a first quick release mechanism to detach the second cylindrical section from the third cylindrical section, wherein the first quick release mechanism comprises:
a first plurality of threading notches spaced around an inner surface of the second cylindrical section; and
a second plurality of threading notches spaced around an exterior surface of the third cylindrical section, the first plurality of threading notches engaging and disengaging the second plurality of threading notches allowing the second cylindrical section to be locked and unlocked from the third cylindrical section by a quarter rotation of one of the second cylindrical section or the third cylindrical section.

2. The herb grinding device of claim 1, wherein the first cylindrical section is magnetically coupled to the second cylindrical section.

3. The herb grinding device of claim 1, comprising a removable screen positioned within the collection cavity.

4. The herb grinding device of claim 3, comprising support arms positioned across the collection cavity to support the removable screen within the collection cavity.

5. The herb grinding device of claim 1, comprising a fourth cylindrical section removably coupled to the third cylindrical section opposite the second cylindrical section.

6. The herb grinding device of claim 5, comprising a second quick release mechanism to detach the third cylindrical section from the fourth cylindrical section.

7. The herb grinding device of claim 6, wherein the second quick release mechanism comprises a third plurality of threading notches spaced around an interior of the third cylindrical section and a fourth plurality of threading notches spaced around an exterior of the fourth cylindrical section, the third plurality of notches engaging and disengaging the fourth plurality of notches allowing the third cylindrical section to be locked and unlocked from the fourth cylindrical section by a quarter rotation of one of the third cylindrical section or the fourth cylindrical section.

8. The herb grinding device of claim 5, comprising a fourth cylindrical section collection cavity formed in the fourth cylindrical section.

9. The herb grinding device of claim 8, comprising a radiused edge formed on the fourth cylindrical section collection cavity.

10. The herb grinding device of claim 8, wherein the fourth cylindrical section collection cavity is, bowl shaped.

11. The herb grinding device of claim 1, wherein the plurality of teeth extending from the top surface within the first cavity comprises at least two concentric teeth rings and the plurality of teeth extending from the second section floor comprises at least two concentric teeth rings.

12. The herb grinding device of claim 11, wherein the at least two concentric teeth rings of the second cylindrical section are positioned between the at least two concentric teeth rings of the first cylindrical section and the plurality of teeth extending from the second section floor at least partially overlap the plurality of teeth extending from the first section floor.

13. An herb grinding device, comprising:
a first cylindrical section comprising a first cavity, a top surface, and a plurality of circular arced teeth extending from the top surface within the first cavity in at least two concentric teeth rings;
a second cylindrical section coupled to the first cylindrical section and comprising a second cavity facing the first cavity, a second section floor, a plurality of holes in the second section floor, and a plurality of circular arced teeth extending from the second section floor within the second cavity in at least two concentric teeth rings, wherein the at least two concentric teeth rings of the second cylindrical section are positioned between the at least two concentric teeth rings of the first cylindrical section and the plurality of circular arced teeth of the second cylindrical section at least partially overlap the plurality of circular arced teeth of the first cylindrical section;
a third cylindrical section removably coupled to the second cylindrical section, the at least third section comprising a collection cavity;
a first quick release mechanism to detach the second cylindrical section from the third cylindrical section, wherein the first quick release mechanism comprises:
a first plurality of threading notches spaced around an inner surface of the second cylindrical section; and a second plurality of threading notches spaced around an exterior surface of the third cylindrical section, the first plurality of threading notches engaging and disengaging the second plurality of threading notches allowing the second cylindrical section to be locked and unlocked from the third cylindrical section by a quarter rotation of one of the second cylindrical section or the third cylindrical section;

a fourth cylindrical section removably coupled to the third cylindrical section opposite the second cylindrical section; and a second quick release mechanism to detach the third cylindrical section from the fourth cylindrical section, wherein the second quick release mechanism comprises:

a third plurality of threading notches spaced around an interior of the third cylindrical section; and a fourth plurality of threading notches spaced around an exterior of the fourth cylindrical section, the third plurality of threading notches engaging and disengaging the fourth plurality of threading notches allowing the third cylindrical section to be locked and unlocked from the fourth cylindrical section by a quarter rotation of one of the third cylindrical section or the fourth cylindrical section.

14. The herb grinding device of claim 13, wherein the third cylindrical section comprises:

extending through the third cylindrical section and one gar more support arms extending across the channel.

15. The herb grinding device of claim 14, comprising a radiused edge formed on, the collection cavity.

* * * * *